Figure 10:
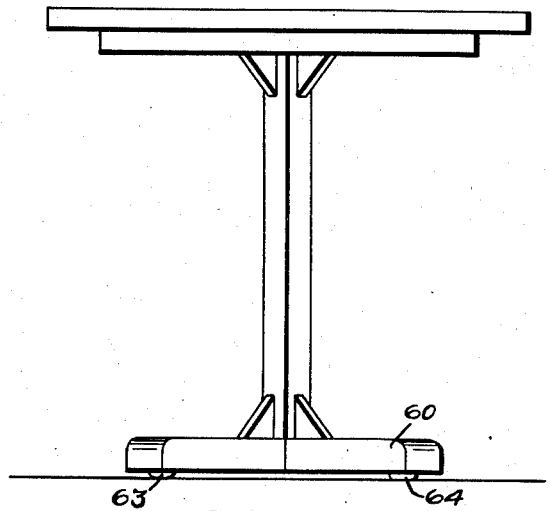

April 2, 1957     W. C. WHITMAN     2,787,087
SELF-ADJUSTING QUADRUPEDAL SUPPORT FOR TABLES AND THE LIKE
Filed March 28, 1955     6 Sheets-Sheet 1
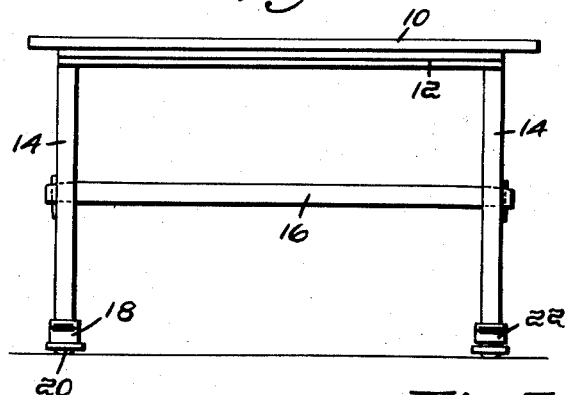
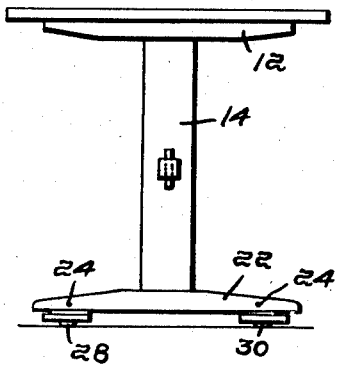
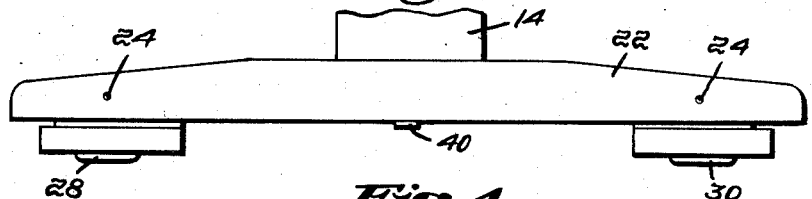
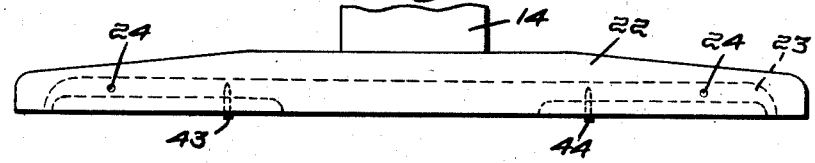
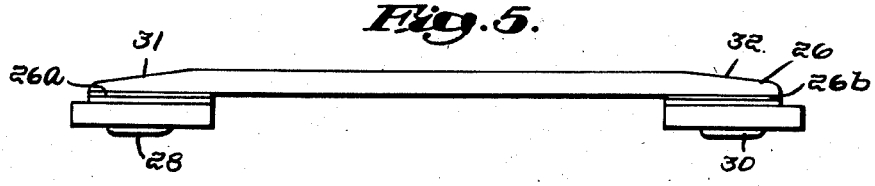
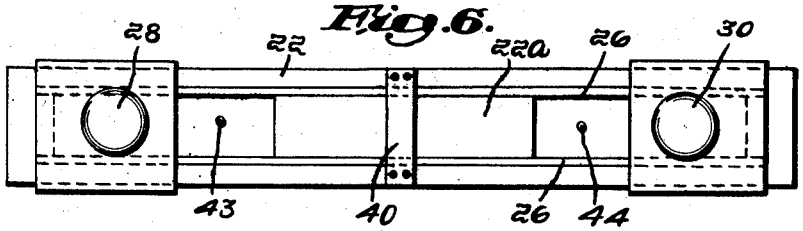
Inventor:
Warren C. Whitman,
by Rowland V. Patrick
Attorney

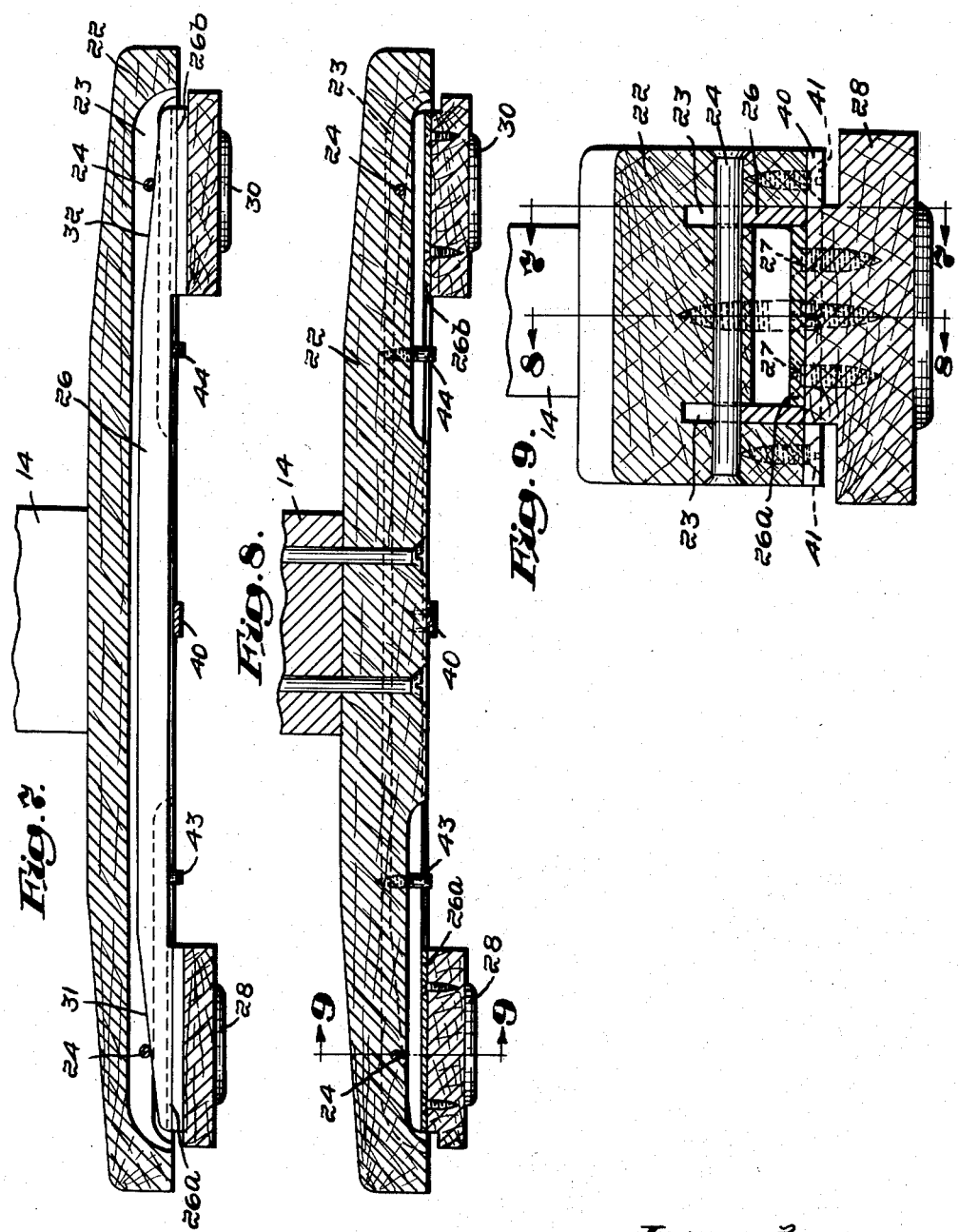

April 2, 1957 W. C. WHITMAN 2,787,087
SELF-ADJUSTING QUADRUPEDAL SUPPORT FOR TABLES AND THE LIKE
Filed March 28, 1955 6 Sheets-Sheet 3

Inventor:
Warren C. Whitman,
by Rowland V. Patrick
Attorney

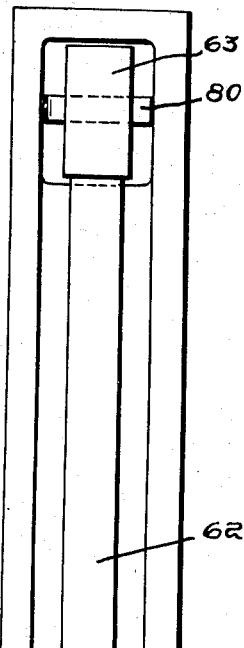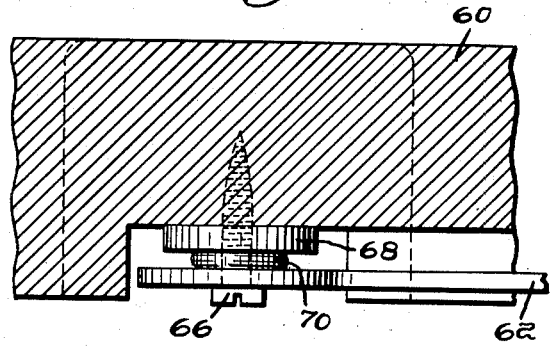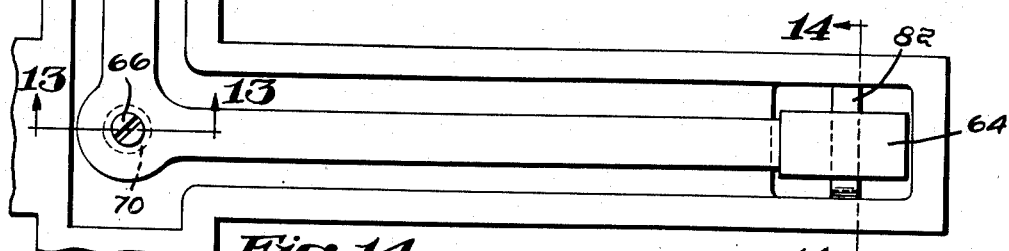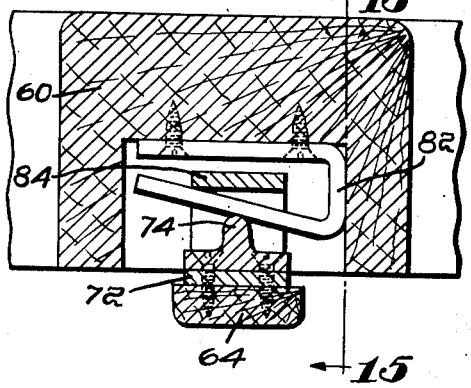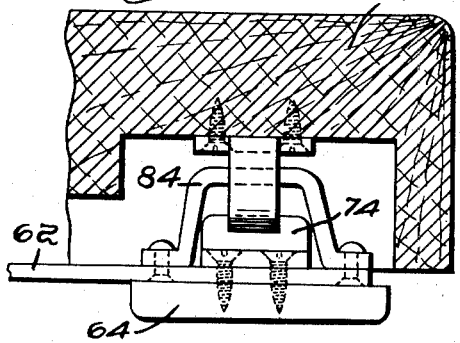

April 2, 1957 W. C. WHITMAN 2,787,087
SELF-ADJUSTING QUADRUPEDAL SUPPORT FOR TABLES AND THE LIKE
Filed March 28, 1955 6 Sheets-Sheet 5
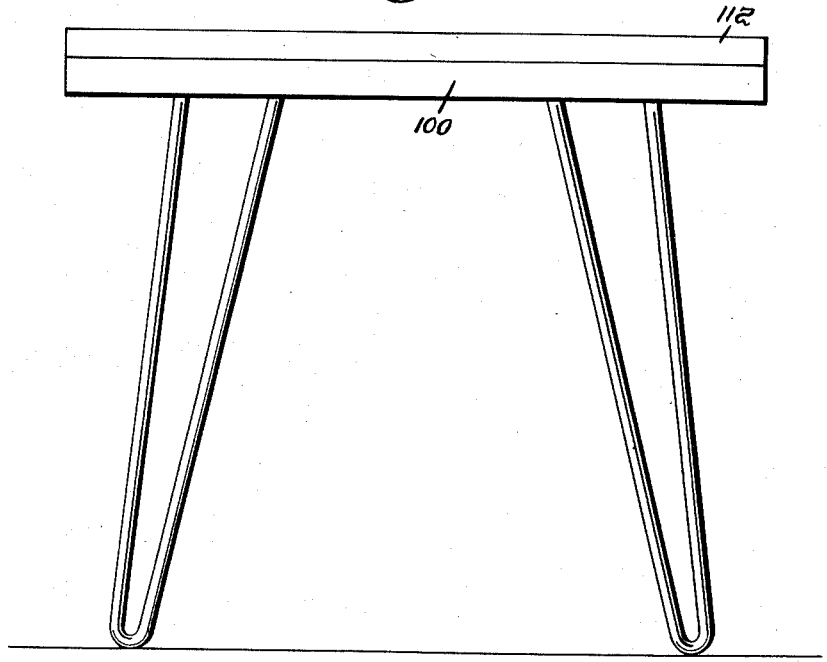
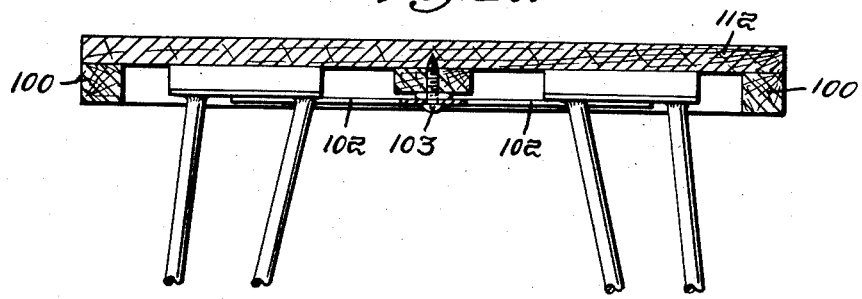

April 2, 1957 W. C. WHITMAN 2,787,087
SELF-ADJUSTING QUADRUPEDAL SUPPORT FOR TABLES AND THE LIKE
Filed March 28, 1955 6 Sheets-Sheet 6
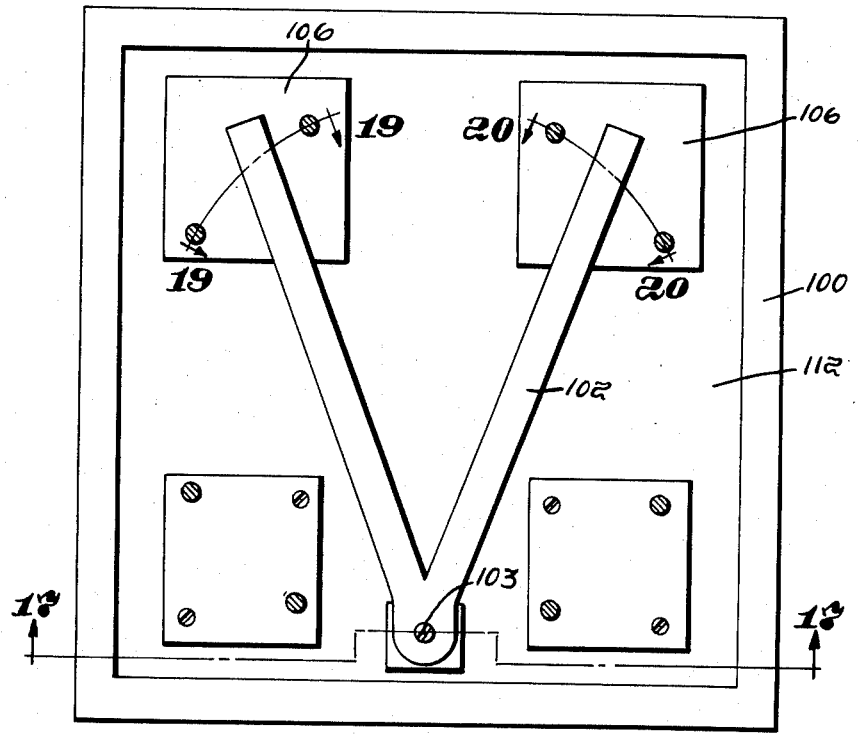
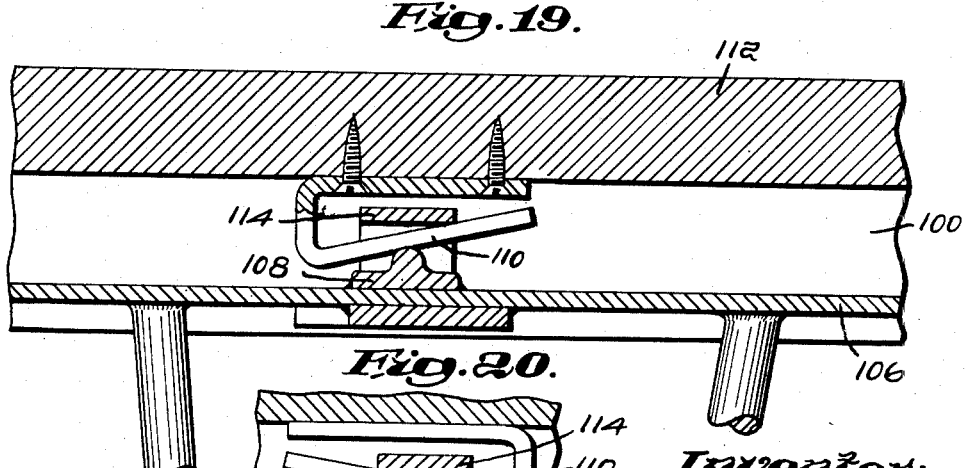
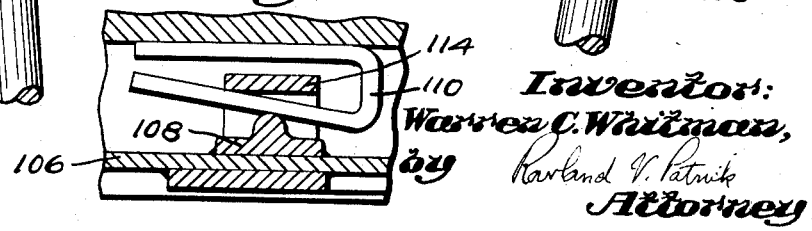
Inventor:
Warren C. Whitman,
by Rowland V. Patrick
Attorney

United States Patent Office 2,787,087
Patented Apr. 2, 1957

2,787,087
SELF-ADJUSTING QUADRUPEDAL SUPPORT FOR TABLES AND THE LIKE

Warren C. Whitman, Winchester, Mass.

Application March 28, 1955, Serial No. 497,006

8 Claims. (Cl. 45—139)

This invention relates to a quadrupedal support for rigidly constructed objects which is self-adjusting to irregular surfaces so the object must attain a fixed stable position and not rock back and forth.

It is an object of this invention to overcome by inherent construction the annoyance of jiggling bodies such as restaurant tables, and thus dispense with such expedients so often resorted to as putting paper matches under one of the legs of a four-legged restaurant table in order to attain some semblance of stability to the table top. This annoyance is so well known and so often encountered that it need not be further discussed.

It is, of course, well known that a tripod will not jiggle on uneven surfaces because all feet are free to rest firmly on the supporting surface, but tripodic tables lack the stability of quadrupedal tables because the center of gravity line is nearer the periphery of the triangle formed by its feet. Therefore that center need be raised less for its line to approach the limits of the base.

It is also well known that quadrupedal support has been almost universally adopted because of the stability its base provides. On uneven surfaces, however, objects so constructed will always rest on only three supports unless provided with some compensator. Steel springs are used on automobiles, but where less adjustment is required silicone plungers, rubber, etc., are used. All these compensate on the principle of yielding. Many objects, of which a dining table is an example, however, require firmer support at all points.

According to this invention, two adjacent supports of such an object are separated from the table leaving the other two attached in the conventional manner for guidance and then these first two legs are fastened together as a unit which in turn is fastened to the body of the table by means of bearings of such design that when either is moved up or down, the other will be activated in the opposite direction and by the same amount. The table thus will rest on all four legs automatically by its own weight. Also, when these bearings are of such design as to place the center of movement of the unit with its two legs far enough below the floor on which the table rests, any additional weight may hasten adjustment of the four feet to the floor but will have no further effect.

While for the purposes of describing the invention reference will be made in the accompanying drawings to furniture and particularly to tables, it should be understood that the support is applicable not only to other types of furniture, such as chairs, chests, bureaus, but is also applicable to industrial machines, carriers such as materials handling devices including trucks, pallets, skids, and wheeled vehicles where any one or more of four points of support comprise wheels.

In the accompanying drawings, Figs. 1–9 illustrate a common form of restaurant table having incorporated therein the structure of the present invention, Fig. 1 being a side elevational view of the table;

Fig. 2 an end elevational view;

Fig. 3 an enlarged detail of the bottom portion of Fig. 2;

Fig. 4 and Fig. 5 being separate views of the parts making up the assembly shown in Fig. 3;

Fig. 6 a bottom view of the structure shown in Fig. 3;

Fig. 7 a cross-sectional view taken along the line 7—7 of Fig. 9;

Fig. 8 being a cross-sectional view taken along the line 8—8 of Fig. 9; and

Fig. 9 being a cross-sectional view taken along the line 9—9 of Fig. 8.

Figure 11:
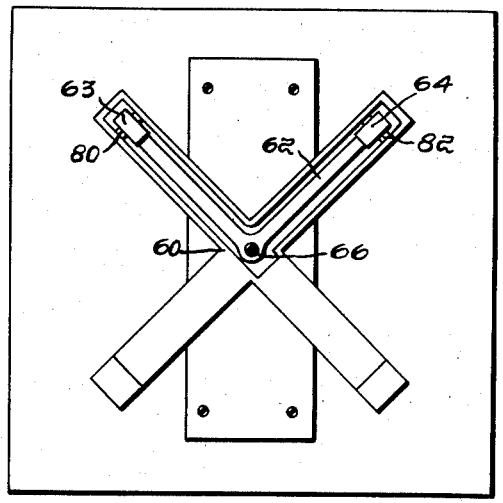

Figs. 10–15 show the invention as applied to a typical pedestal restaurant table;

Fig. 10 being an elevational view;

Fig. 11 a bottom plan view;

Fig. 12 an enlarged detail of part of the structure shown in Fig. 11;

Fig. 13 a detailed cross-sectional view taken along the line 13—13 of Fig. 12;

Fig. 14 a cross-sectional view taken along the line 14—14 of Fig. 12; and

Fig. 15 a detailed cross-sectional view taken along the line 15—15 of Fig. 14.

Figs. 16–20 show a third form of table wherein the operating structure is incorporated beneath the table top instead of near the floor, Fig. 16 being an elevational view of the table;

Fig. 17 a cross-sectional view taken along the line 17—17 of Fig. 18;

Fig. 18 a cross-sectional view taken beneath the table top;

Fig. 19 being a cross-sectional view taken along the arc 19—19 of Fig. 18; and

Fig. 20 being a cross-sectional view taken along the arc 20—20 of Fig. 18.

Referring first to the construction as shown in Figs. 1–9, the table comprises the usual table top 10 supported by a frame 12 having downwardly extending legs 14, one at each end of the table. A reinforcing cross-bar 16 extends between the legs 14, 14.

The leg 14 at the left as shown in Fig. 1 terminates at the bottom in a crosspiece 18 having the usual spaced feet near its extremities. All this construction at the left-hand end of the table is conventional.

At the right-hand end of the table as shown in Fig. 1, however, I modify the construction of the horizontal legs 22 corresponding to the other horizontal legs 18. As shown in Fig. 9, these horizontal legs 22 are undercut to provide two longitudinally extending deep grooves 23 which widen near each end at the bottom but are separated in the center of the crosspiece portion 22a (Fig. 6). Two spaced pins 24 extend transversely of the legs 22 and constitute bearing surfaces for the right-hand end of the table.

These two bearing surfaces 24, 24 bear on a rigid equalizer member 26 which may be made of spaced upright metal bars joined at both ends by base plates 26a and 26b. Secured to the base plates by screws 27 are two feet 28 and 30 constituting the pair of spaced feet for the right-hand end of the table. The equalizer member is so proportioned and shaped that it has inclined upper bearing surfaces 31 and 32, one at each end, formed by the tops of the upright bars, and which, as shown in Fig. 7, engage the pins 24.

In order to retain the equalizer member 26 against separation from the horizontal legs 22 when the table is lifted off the floor, I provide a cross-strap 40 extending beneath the equalizer member and held by screws 41 to legs 22.

Screws 43, 44 constitute stops to limit transverse motion of the equalizer member 26 as confined by cross-strap 40, by engaging the inner edges of base plates 26a and 26b.

It will thus be seen that when the table is placed upon any surface, if one of the legs 28 or 30 tends to drop out of the plane of the other three legs of the table, added weight will be exerted through the other pin 24 against the inclined surface against which it bears which will cause the equalizer member 30 to move one way or the other and therefore retain the horizontal legs 22 in a plane parallel to the floor engaging surfaces of the feet 20 even though the equalizer member is tilted with respect thereto.

The structure shown in Figs. 10-15 is similar except that by reason of the cruciform nature of the bottom pieces 60 it is inadvisable to use a straight equalizer member between two adjacent feet and hence the equalizer member takes the form of a bell crank 62 still having feet 63 and 64 respectively near its extremities.

As shown in Figs. 12 and 13, the bell crank lever 62 is pivoted at the center of the cruciform at 66 and the pivot is so arranged with washers 68 and 70 that the bell crank lever 62 will also have limited rocking motion relative to the pieces 60.

As shown in Fig. 14 near the extremity of the leg of the bell cank lever 62 there is fastened a foot pad 63 on its under side and, on its upper side, a longitudinally extending bearing surface 74 which bears against an inclinded surface 80 on the bottom of a U-shaped member 82, the upper leg of which is fixed by screws to one of the cruciform legs 60.

It will thus be seen that as the bell crank arm 62 pivots around its pivot point 66, the surface 80 will act as a cam causing raising or lowering of the foot 63 depending upon the direction of pivoting motion.

The construction at the other extremity of the bell crank lever is identical except that the strap has an oppositely inclined bearing surface 82 so that as the bell crank lever rocks, insofar as one of the feet is raised or lowered, the other foot will be correspondingly lowered or raised the same amount. It will be noted that the upright portions of the bent members 82 act as limiting stops. I also provide straps 84, passing over the bottom legs of members 82, and thus retain the ends of the bell crank against separation from the table, when the table is lifted.

This construction of Figs. 10-15 therefore incorporates the same principle as that shown in the table of Fig. 9 in that the engaging bearing surfaces on the frame and on the equalizer member provide cooperative camming action for rocking the feet 63 and 64 with respect to the fixed level of the other pair of feet for the table.

The construction shown in Figs. 16-20 is substantially identical with the exception that the operating structure is incorporated beneath an apron 100 of a popular form of wirelegged table. Here the bell crank lever 102 is pivoted at 103 and the extremities are welded to square plates 106, which plates bear on their upper surfaces the camming elements 108 which engage the camming surfaces 110 which are screwed to the wooden table top 112. The construction is otherwise identical in operation with that described in Figs. 10-15, including the retaining straps 114.

The angle of inclination of the camming surfaces may be about 11° in the form of tables shown in the drawings. The angle should, in general, be such, when taken with the distance between the bearing surfaces, perpendiculars to the camming surfaces intersect below floor level and at a distance below the camming surfaces at least equal to the table height. If the angle is too steep, stability is lost and if the angle is too little, self-adjustment is more difficult because of the greater horizontal component of motion required for the equalizer bar to reach a compensating position.

It should be understood that, if desired, the camming surfaces may be slightly curved and, in fact, can lie in arcs of a common circle whose radius is at least equal to the height of the table, or comprise, particularly in the Fig. 1 table, a continuous arc of such a circle. In the latter case, the camming elements may likewise comprise a continuous curved surface at the same radius, instead of being separate elements.

It will thus be seen that I have provided a quadrupedal support for tables and the like having four points of support and having between two of said points of support and the floor an equalizer member which automatically self-adjusts itself with respect to irregularities in the floor while maintaining all of said four points of suspension in substantially the same plane as if the table were resting on a perfectly level floor.

When used in the accompanying claims it will be understood that where reference is made to a floor it is to be understood to be inclusive of other supporting surfaces such as are found outdoors, including the ground, flagstone terraces, etc.

I claim:

1. A self-leveling quadrupedal support for bodies such as dining tables and the like comprising a frame having four fixed bearing surfaces acting as spaced areas of support for said frame and lying at the corners of a quadrangle, two of said bearing surfaces being at floor level and constituting the floor engaging surfaces of one pair of adjacent spaced feet of said support, the other two of said bearing surfaces being above floor level, an equalizer member extending beneath and having spaced bearing-surfaces engaging said above-floor-level bearing surfaces, floor engaging surfaces adjacent the extremities of said equalizer member and providing the other pair of feet for said support, said engaging frame and equalizer member bearing surfaces cooperatively constituting camming surfaces mounting said equalizer member for limited transverse rocking motion relative to said frame to tilt said equalizer member responsive to downward pressure exerted on said body and simultaneously elevate one foot and depress the other foot with respect to the level of said fixed feet responsive to irregularities in the level of the floor on which said body is placed, and means limiting the rocking travel of said equalizer member and retaining the same against separation from said frame.

2. A support as claimed in claim 1 wherein said equalizer member is a straight member extending between said other pair of feet and having its camming surfaces spaced inwardly from its floor engaging surfaces.

3. A support as claimed in claim 1 wherein the frame camming surfaces are spaced fixed pins extending transversely across the equalizer member camming surfaces.

4. A support as claimed in claim 1 wherein the camming surfaces lie in inclined planes having opposite inclination.

5. A support as claimed in claim 1 wherein the camming surfaces lie in inclined planes which diverge downwardly at an angle of about 11°.

6. A support as claimed in claim 1 wherein the equalizer member comprises a crank lever mounted on said frame for pivotal and rocking motion.

7. A support as claimed in claim 1 wherein said body is a table having a table top and said camming surfaces are adjacent said table top and said rocking feet are disposed at the bottom ends of legs extending downwardly from the extremities of said equalizer member.

8. A support as claimed in claim 4 wherein the inclined planes diverge downwardly.

References Cited in the file of this patent

UNITED STATES PATENTS

| 2,540,750 | Morrison | Feb. 6, 1951 |
| 2,695,147 | Castricone | Nov. 23, 1954 |

FOREIGN PATENTS

| 394,848 | Great Britain | July 6, 1933 |
| 993,304 | France | July 18, 1951 |